(12) United States Patent
Miyake et al.

(10) Patent No.: US 12,097,917 B2
(45) Date of Patent: Sep. 24, 2024

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Junya Miyake, Okazaki (JP); Takashi Kodera, Okazaki (JP); Toru Takashima, Susono (JP); Hidetsugu Toyama, Susono (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 17/474,157

(22) Filed: Sep. 14, 2021

(65) Prior Publication Data

US 2022/0081030 A1 Mar. 17, 2022

(30) Foreign Application Priority Data

Sep. 17, 2020 (JP) ................. 2020-156290

(51) Int. Cl.
 *B62D 6/10* (2006.01)
 *B62D 5/04* (2006.01)

(52) U.S. Cl.
 CPC ............. *B62D 6/10* (2013.01); *B62D 5/0421* (2013.01); *B62D 5/0463* (2013.01)

(58) Field of Classification Search
 CPC ...... B62D 6/10; B62D 5/0421; B62D 5/0463; B62D 5/0481; B62D 6/008; B62D 6/002; B62D 6/02
 USPC ........................................................ 701/42
 See application file for complete search history.

(56) References Cited

U.S. PATENT DOCUMENTS

| 2008/0066995 | A1 | 3/2008 | Yabuguchi et al. |
| 2013/0158806 | A1* | 6/2013 | Sugiyama ............... B62D 6/02 |
| | | | 701/41 |
| 2019/0092383 | A1 | 3/2019 | Kodera |
| 2019/0233001 | A1 | 8/2019 | Namikawa et al. |
| 2021/0114653 | A1* | 4/2021 | Tsubaki ............... B62D 5/0409 |

FOREIGN PATENT DOCUMENTS

| JP | 2013-177045 A | 9/2013 |
| JP | 2019-059392 A | 4/2019 |
| JP | 2019-127214 A | 8/2019 |

OTHER PUBLICATIONS

Feb. 18, 2022 Search Report issued in European Patent Application No. 21196791.4.
Feb. 6, 2024 Office Action issued in Japanese Patent Application No. 2020-156290.

* cited by examiner

Primary Examiner — Scott A Reinbold
(74) Attorney, Agent, or Firm — Oliff PLC (57) ABSTRACT

A steering control device is configured to control a steering device as a controlled object, the steering device having a structure in which transmission of power between a steering portion and a turning portion is cut off. The steering control device includes a central processing unit. The central processing unit is configured to execute a reduction process in a case where at least either one of a travel state amount and a steering state amount is a state amount indicating that a target turning-corresponding angle does not change. The reduction process is a process of reducing a driving current to be supplied to a turning motor.

7 Claims, 5 Drawing Sheets

STEERING CONTROL DEVICE

CROSS-REFERENCE TO RELATED APPLICATION

This application claims priority to Japanese Patent Application No. 2020-156290 filed on Sep. 17, 2020, incorporated herein by reference in its entirety.

BACKGROUND

1. Technical Field

The present disclosure relates to a steering control device.

2. Description of Related Art

Japanese Unexamined Patent Application Publication No. 2019-59392 (JP 2019-59392 A) describes a steer-by-wire steering device. The steer-by-wire steering device is configured such that power transmission between a steering portion and a turning portion is cut off. The steering portion is connected to a steering wheel, and the turning portion is configured to turn steered wheels in response to steering input into the steering portion. A steering control device configured to control the steer-by-wire steering device as a controlled object includes a turning controlling portion configured to control an operation of a turning motor that applies a turning force to the turning portion. The turning force is a force by which the steered wheels are turned. The turning controlling portion calculates a target value for a driving current to be supplied to the turning motor by executing a turning angle feedback control by which a turning angle of the steered wheels follows a target turning angle calculated in accordance with steering by a driver. The turning controlling portion controls the operation of the turning motor based on the target value for the driving current to be supplied to the turning motor.

SUMMARY

The steered wheels stand still at a position where the force to turn the steered wheels balances with a frictional force of a road surface. The frictional force of the road surface varies depending on a road-surface condition. Accordingly, the turning angle at the time when the force to turn the steered wheels balances with the frictional force of the road surface may deviate from the target turning angle. In this case, a difference occurs between the target turning angle and the turning angle. For example, even when a vehicle stops temporarily, and the steering wheel is in a steering hold state or a hand-off state, the turning controlling portion calculates a target value for the driving current that reduces the difference between the target turning angle and the turning angle. However, when the difference is small, such a situation is assumed that, even when the driving current is supplied to the turning motor in accordance with the difference, the position of the steered wheels thus standing still does not change. In this case, the driving current might continuously flow into the turning motor due to the difference constantly caused between the target turning angle and the turning angle.

The present disclosure provides a steering control device that can reduce power consumption.

A steering control device according to an aspect of the present disclosure is a steering control device configured to control a steering device as a controlled object. The steering device has a structure in which transmission of power between a steering portion and a turning portion is cut off. The steering portion is connected to a steering wheel, and the turning portion is configured to turn steered wheels in response to steering input into the steering portion. The steering control device includes a central processing unit configured to: control an operation of a turning motor configured to apply a turning force to the turning portion, the turning force being a force by which the steered wheels are turned; calculate a turning target current value as a target value for a driving current to be supplied to the turning motor by executing a turning-angle feedback control such that an actual turning-corresponding angle follows a target turning-corresponding angle as a target value for the turning angle of the steered wheels; control an operation of the turning motor based on the turning target current value; execute a reduction process of reducing the driving current to be supplied to the turning motor; and execute the reduction process in a case where at least either one of a travel state amount and a steering state amount is a state amount indicating that the target turning-corresponding angle does not change, the travel state amount being indicative of a travel state of a host vehicle, the steering state amount being indicative of a steering state of the host vehicle.

In a case where the travel state amount indicates that the target turning-corresponding angle does not change, or in a case where the steering state amount indicates that the target turning-corresponding angle does not change, when a force to turn the steered wheels balances with a frictional force of a road surface, the turning-corresponding angle does not change. At this time, a difference might be caused between the target turning-corresponding angle and the turning-corresponding angle. In this respect, it is assumed that a state where the target turning-corresponding angle does not change is a state where the need for the turning motor to apply a turning force to the steered wheels so as to turn the steered wheels is low. In the above configuration, in a case where the travel state amount indicates that the target turning-corresponding angle does not change, or in a case where the steering state amount indicates that the target turning-corresponding angle does not change, the reduction process of reducing the driving current to be supplied to the turning motor is executed. Hereby, it is possible to restrain the driving current to be supplied to the turning motor, the driving current being caused when a turning angle deviates from a target turning angle at the time when the force to turn the steered wheels balances with the frictional force of the road surface.

In the above aspect, in a case where a vehicle speed as the travel state amount is a low vehicle speed including a stop state of the host vehicle, the central processing unit may be configured to determine that the travel state amount corresponds to the state amount indicating that the target turning-corresponding angle does not change, and the central processing unit may be configured to execute the reduction process.

In the above configuration, in a case where the vehicle speed is a low vehicle speed, the turning motor can be hardly brought into a state where the turning motor applies a turning force to the steered wheels so as to turn the steered wheels, in comparison with a case where the vehicle speed is a high vehicle speed. Accordingly, a state where the reduction process is executed can be made more appropriate under the condition that the vehicle speed is a low vehicle speed.

In the above aspect, in a case where the steering state amount has a value indicating that the steering wheel is in a steering hold state or the steering wheel is in a hand-off state, the central processing unit may be configured to determine that the steering state amount corresponds to the state amount indicating that the target turning-corresponding angle does not change, and the central processing unit may be configured to execute the reduction process.

In the above configuration, in a case where the steering state amount has a value indicating that the steering wheel is in the steering hold state or the steering wheel is in the hand-off state, it is assumed that the driver does not input, into the steering portion, steering to change the turning-corresponding angle. In this case, the steered wheels can be hardly brought into a state where the steered wheels are turned by receiving a turning force from the turning motor, in comparison with cases such as a case where a driver cuts the steering wheel. On this account, the state where the reduction process is executed can be made more appropriate under the condition that the steering state amount has a value indicating that the steering wheel is in the steering hold state or the steering wheel is in the hand-off state.

In the above aspect, the central processing unit may be configured to calculate the target turning-corresponding angle in accordance with steering input into the steering portion, and the central processing unit may be configured to bring the target turning-corresponding angle close to the actual turning-corresponding angle in the reduction process.

In the above configuration, when the target turning-corresponding angle is brought close to the turning-corresponding angle, it is possible to decrease a difference between the target turning-corresponding angle and the turning-corresponding angle. In the above configuration, the central processing unit may be configured to calculate an offset angle based on the target turning-corresponding angle and the actual turning-corresponding angle, the offset angle being an amount by which the target turning-corresponding angle is brought close to the actual turning-corresponding angle. The central processing unit may be configured to correct the target turning-corresponding angle by adding or subtracting the offset angle to or from the target turning-corresponding angle. The central processing unit may be configured to calculate the turning target current value based on the corrected target turning-corresponding angle.

In the above configuration, the central processing unit may be configured to correct an offset angle calculated in a present calculation cycle, based on the travel state amount and the steering state amount. The central processing unit may be configured to correct the target turning-corresponding angle by adding or subtracting the corrected offset angle to or from the target turning-corresponding angle.

In the above configuration, the frictional force of the road surface varies depending on a road-surface condition, and therefore, the difference between the target turning-corresponding angle and the turning-corresponding angle varies each time. On this account, it is assumed that an appropriate offset angle to decrease the difference between the target turning-corresponding angle and the turning-corresponding angle varies each time. In view of this, an offset angle correcting portion corrects the offset angle at every calculation cycle. Hereby, the target turning-corresponding angle can be corrected appropriately such that the target turning-corresponding angle is brought close to the turning-corresponding angle.

In the above configuration, the central processing unit may be configured to change a correction amount to decrease the offset angle, based on at least either one of the travel state amount and the steering state amount.

For example, in a case of the travel state amount indicating that the vehicle travels at a relatively high vehicle speed, or in a case of the steering state amount indicating that a turning portion configured to turn the steered wheels is turning the steered wheels, even when a correction amount to decrease the offset angle is made large, and the correction amount thus made large appears as an unexpected movement of the turning portion for the driver, it may be said that the movement can be hardly transmitted to the driver as an uncomfortable feeling. In view of this, the above configuration considers the travel state amount or the steering state amount, and therefore, the above configuration is effective to devise a way to eliminate the offset angle as soon as possible while the uncomfortable feeling for the driver is restrained.

In the above configuration, in a state where the reduction process is executed, in a case where at least either one of the travel state amount and the steering state amount is a state amount indicating that the target turning-corresponding angle changes, the central processing unit may be configured to end the execution of the reduction process. When the state where the reduction process is executed shifts to a state where the reduction process is not executed, the central processing unit may be configured to gradually decrease an absolute value of the offset angle.

In the above configuration, by gradually decreasing the absolute value of the offset angle by which the target turning-corresponding angle is brought close to the turning-corresponding angle, the target turning-corresponding angle changes slowly. This makes it possible to slowly shift from the state where the reduction process is executed to the state where the reduction process is not executed.

With the above aspect, it is possible to reduce power consumption.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
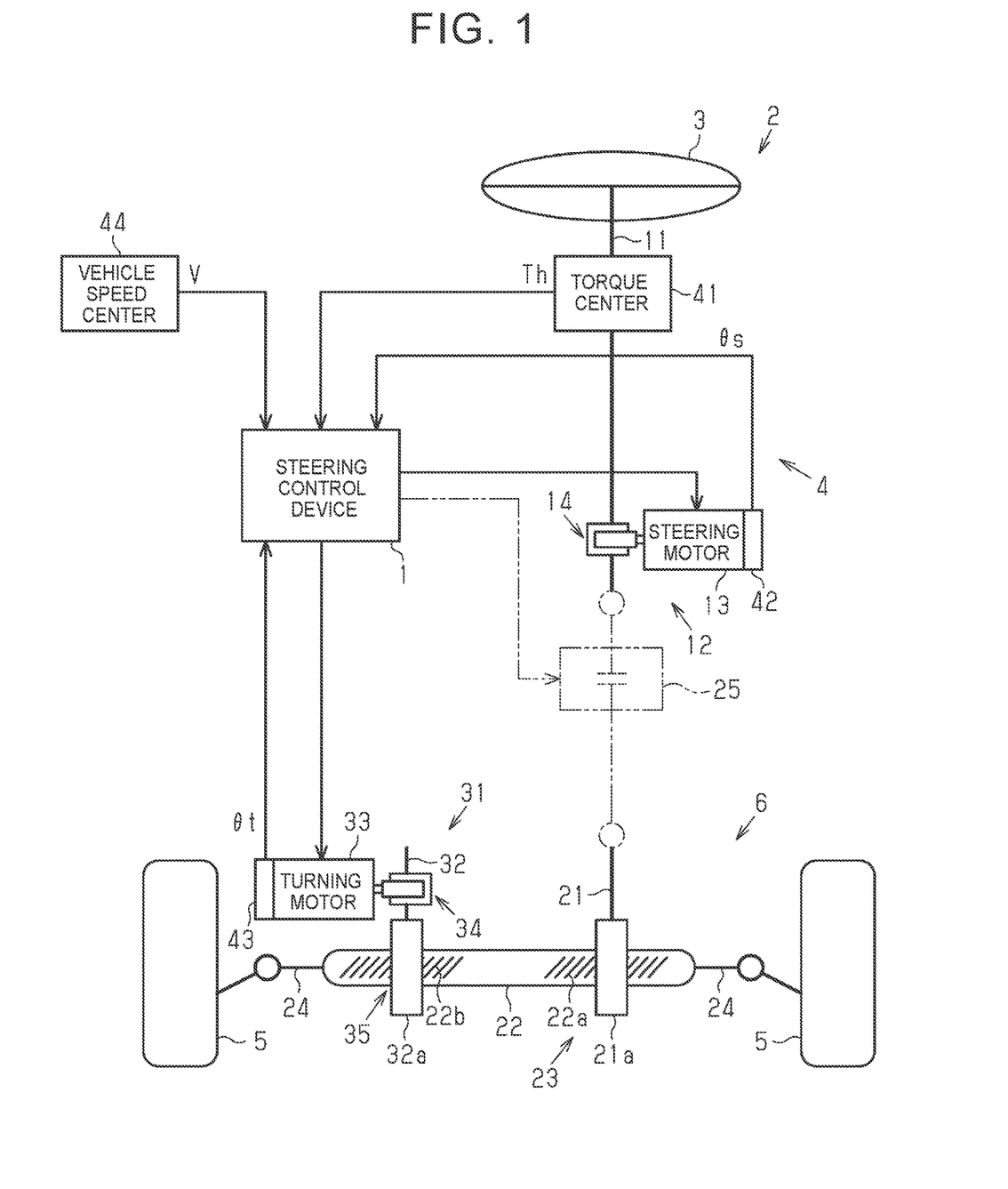
FIG. 1 is a view illustrating a schematic configuration of a steer-by-wire steering device.

One embodiment of a steering control device will be described with reference to the drawings. As illustrated in FIG. 1, a steering device 2 as a controlled object to be controlled by the steering control device 1 is configured as a steer-by-wire steering device. The steering device 2 includes a steering portion 4 configured to be steered by a driver via a steering wheel 3, and a turning portion 6 configured to turn steered wheels 5 in response to steering input into the steering portion 4 by the driver.

The steering portion 4 includes a steering shaft 11 to which the steering wheel 3 is fixed, and a steering actuator 12 configured to apply a steering reaction force to the steering wheel 3 via the steering shaft 11, the steering reaction force being a force against the steering by the driver. The steering actuator 12 includes a steering motor 13 serving as a drive source, and a steering speed reducer 14 configured to decelerate rotation of the steering motor 13 and transmit the rotation to the steering shaft 11. As the steering motor 13 in the present embodiment, a three-phase brushless motor is employed, for example.

The turning portion 6 includes a first pinion shaft 21, and a rack shaft 22 connected to the first pinion shaft 21. The first pinion shaft 21 and the rack shaft 22 are placed at a predetermined crossing angle. A first rack-and-pinion mechanism 23 is configured by engaging pinion teeth 21a formed on the first pinion shaft 21 with first rack teeth 22a formed on the rack shaft 22. The first pinion shaft 21 is a rotating shaft that can convert its rotation to a turning angle of the steered wheels 5. Respective tie rods 24 are connected to the opposite ends of the rack shaft 22. Respective distal ends of the tie rods 24 are connected to respective knuckles (not illustrated) to which the right and left steered wheels 5 are assembled, respectively.

The turning portion 6 includes a turning actuator 31 configured to apply, to the rack shaft 22, a turning force to turn the steered wheels 5. The turning actuator 31 applies the turning force to the rack shaft 22 via a second pinion shaft 32. The turning actuator 31 includes a turning motor 33 serving as a drive source, and a turning speed reducer 34 configured to decelerate rotation of the turning motor 33 and transmit the rotation to the second pinion shaft 32. The second pinion shaft 32 and the rack shaft 22 are placed at a predetermined crossing angle. A second rack-and-pinion mechanism 35 is configured by engaging second pinion teeth 32a formed on the second pinion shaft 32 with second rack teeth 22b formed on the rack shaft 22.

In the steering device 2 configured as such, the turning angle of the steered wheels 5 is changed such that the second pinion shaft 32 is driven to rotate by the turning actuator 31 in response to a steering operation by the driver, and the rotation of the second pinion shaft 32 is converted into an axial movement of the rack shaft 22 via the second rack-and-pinion mechanism 35. At this time, a steering reaction force against the steering made by the driver is applied to the steering wheel 3 from the steering actuator 12.

The following describes an electrical configuration of the steering device 2. The steering control device 1 is connected to the steering motor 13 and the turning motor 33. The steering control device 1 controls operations of the steering motor 13 and the turning motor 33. The steering control device 1 includes a central processing unit (CPU) and a memory (not illustrated). The steering control device 1 executes various controls such that the CPU executes programs stored in the memory at every predetermined calculation cycle.

A torque sensor 41 configured to detect a steering torque Th applied to the steering shaft 11 is connected to the steering control device 1. The torque sensor 41 is provided closer to the steering wheel 3 than a connecting portion of the steering shaft 11 with the steering speed reducer 14. The torque sensor 41 detects the steering torque Th based on distortion of a torsion bar spring provided in the middle of the steering shaft 11. A steering rotation angle sensor 42 and a turning rotation angle sensor 43 are connected to the steering control device 1. The steering rotation angle sensor 42 detects a rotation angle θs of the steering motor 13 in terms of a relative angle within 360 degrees, as a detection value indicative of a steering amount of the steering portion 4. The turning rotation angle sensor 43 detects a rotation angle θt of the turning motor 33 in terms of a relative angle, as a detection value indicative of a turning amount of the turning portion 6. A vehicle speed sensor 44 is connected to the steering control device 1. The vehicle speed sensor 44 detects a vehicle speed V as a traveling speed of the vehicle. Note that, when the steering is performed in the right direction, the steering torque Th and the rotation angles θs, θt are detected as positive values, and when the steering is performed in the left direction, they are detected as negative values.

The steering control device 1 executes a reaction force control such that a steering reaction force is generated in accordance with the steering torque Th through a drive control on the steering motor 13. Further, the steering control device 1 executes a turning control such that the steered wheels 5 are turned in accordance with a steering state through a drive control on the turning motor 33.

The following describes a configuration of the steering control device 1. The steering control device 1 includes the central processing unit (CPU) and the memory (not illustrated), and the CPU executes programs stored in the memory at every predetermined calculation cycle. Hereby, various processes are executed.

Figure 2:
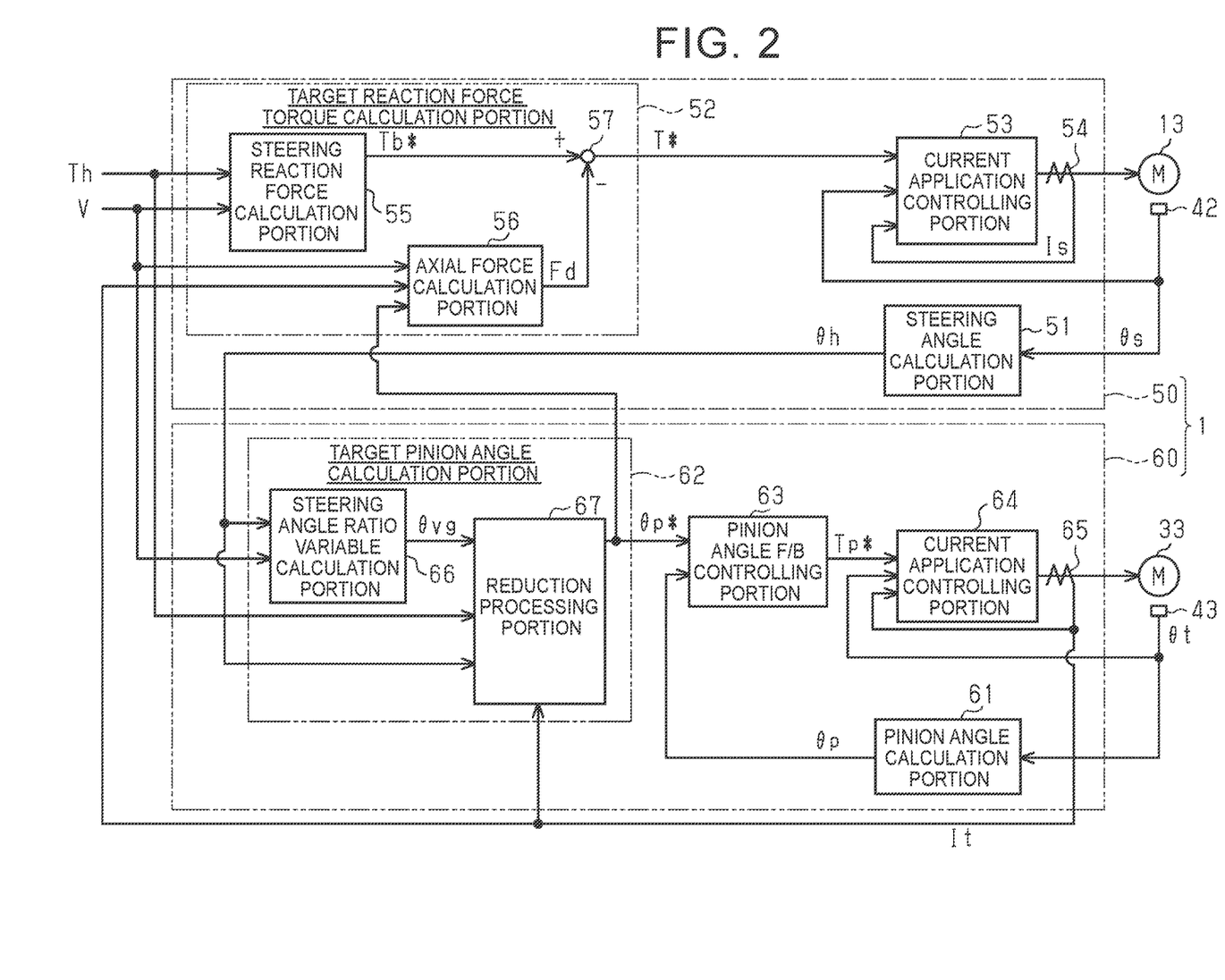
FIG. 2 is a block diagram illustrating a schematic configuration of a steering control device.

FIG. 2 illustrates some of the processes executed by the steering control device 1. In FIG. 2, some of the processes implemented by the CPU executing the programs stored in the memory are described for respective types of the processes to be implemented.

As illustrated in FIG. 2, the steering control device 1 includes a steering controlling portion 50 configured to execute a reaction force control, and a turning controlling portion 60 configured to execute a turning control. The steering controlling portion 50 includes a steering-side current sensor 54. The steering-side current sensor 54 detects a steering-side actual current value Is to be obtained from a current value of each phase of the steering motor 13 in a connecting wire between the steering controlling portion 50 and a motor coil of the each phase of the steering motor 13. The steering-side actual current value Is indicates a value of an actual driving current to be supplied to the steering motor 13. The steering-side current sensor 54 acquires, as a current, a voltage drop of a shunt resistor connected to a source side of each switching element in an inverter (not illustrated) provided for the steering motor 13. Note that, in FIG. 2, for purpose of this description, the connecting wires of respective phases and the current sensors of the respective phases are illustrated collectively as one connecting wire and one current sensor.

The turning controlling portion 60 includes a turning-side current sensor 65. The turning-side current sensor 65 detects a turning-side actual current value It to be obtained from a current value of each phase of the turning motor 33 in a connecting wire between the turning controlling portion 60 and a motor coil of the each phase of the turning motor 33. The turning-side actual current value It indicates a value of an actual driving current to be supplied to the turning motor 33. The turning-side current sensor 65 acquires, as a current, a voltage drop of a shunt resistor connected to a source side of each switching element in an inverter (not illustrated) provided for the turning motor 33. Note that, in FIG. 2, for purpose of this description, the connecting wires of respective phases and the current sensors of the respective phases are illustrated collectively as one connecting wire and one current sensor.

The following describes a configuration of the steering controlling portion 50. The steering torque Th, the vehicle speed V, the rotation angle θs, the turning-side actual current value It, and a pinion angle θp (described later) are input into the steering controlling portion 50. The steering controlling portion 50 controls power supply to the steering motor 13 based on the steering torque Th, the vehicle speed V, the rotation angle θs, the turning-side actual current value It, and the pinion angle θp. Note that the pinion angle θp is calculated based on the rotation angle θt.

The steering controlling portion 50 includes a steering angle calculation portion 51, a target reaction force torque calculation portion 52, and a current application controlling portion 53. The rotation angle θs is input into the steering angle calculation portion 51. The steering angle calculation portion 51 converts the rotation angle θs into an accumulation angle including a range exceeding 360° by counting a rotation number of the steering motor 13 from a steering neutral position that is a position of the steering wheel 3 when the vehicle travels straight, for example. The steering angle calculation portion 51 calculates a steering angle θh by multiplying the accumulation angle obtained by the conversion by a scaling factor based on a rotation speed ratio of the steering speed reducer 14. Note that, when the steering angle θh is an angle on the right side from the steering neutral position, the steering angle θh is positive, and when the steering angle θh is an angle on the left side from the steering neutral position, the steering angle θh is negative, for example. The steering angle θh thus obtained is output to the turning controlling portion 60.

The steering torque Th, the vehicle speed V, the turning-side actual current value It, and a target pinion angle θp* (described later) are input into the target reaction force torque calculation portion 52. The target reaction force torque calculation portion 52 calculates a target reaction force torque T* as a reaction force control amount based on the steering torque Th, the vehicle speed V, the turning-side actual current value It, and the target pinion angle θp*. The target reaction force torque T* as the reaction force control amount is a target for a steering reaction force of the steering wheel 3 that should be caused through the steering motor 13.

More specifically, the target reaction force torque calculation portion 52 includes a steering reaction force calculation portion 55 and an axial force calculation portion 56. The steering torque Th and the vehicle speed V are input into the steering reaction force calculation portion 55. The steering reaction force calculation portion 55 calculates a steering reaction force component Tb* based on the steering torque Th and the vehicle speed V. The steering reaction force component Tb* indicates a motor torque to rotate the steering wheel 3 in a direction of the steering made by the driver, that is, an assist force to assist the steering of the steering wheel 3 by the driver. As the absolute value of the steering torque Th is larger, or as the vehicle speed V is slower, the steering reaction force calculation portion 55 calculates the steering reaction force component Tb* with a larger absolute value. The steering reaction force component Tb* thus obtained is output to a subtractor 57.

The vehicle speed V, the turning-side actual current value It, and the target pinion angle θp* (described later) are input into the axial force calculation portion 56. The axial force calculation portion 56 calculates an axial force to be applied to the rack shaft 22 through the steered wheels 5 based on the vehicle speed V, the turning-side actual current value It, and the target pinion angle θp*. The, the axial force calculation portion 56 calculates a steering reaction force corresponding to the axial force, that is, a torque conversion value obtained by converting the axial force to a torque as an axial force component Fd. The axial force component Fd thus obtained is output to the current application controlling portion 53 as a target reaction force torque T* to be obtained through the subtractor 57 by subtracting the axial force component Fd from the steering reaction force component Tb*.

The target reaction force torque T*, the steering-side actual current value Is, and the rotation angle θs are input into the current application controlling portion 53. The current application controlling portion 53 supplies a driving current corresponding to the target reaction force torque T* to the steering motor 13. The current application controlling portion 53 calculates a steering-side target current value for the steering motor 13 based on the target reaction force torque T*. Then, the current application controlling portion 53 finds a difference between the steering-side target current value and a current value on dq coordinates that is obtained by converting, based on the rotation angle θs, the steering-side actual current value Is detected through the steering-side current sensor 54, and the current application controlling portion 53 controls power supply to the steering motor 13 so as to eliminate the difference. The steering motor 13 generates a torque corresponding to the target reaction force torque T*. Hereby, a moderate reaction feeling corresponding to a road-surface reaction force can be given to the driver.

The following describes a configuration of the turning controlling portion 60. The steering torque Th, the vehicle speed V, the steering angle θh, and the rotation angle θt are input into the turning controlling portion 60. The turning controlling portion 60 controls power supply to the turning motor 33 based on the steering torque Th, the vehicle speed V, the steering angle θh, and the rotation angle θt.

The turning controlling portion 60 includes a pinion angle calculation portion 61, a target pinion angle calculation portion 62, a pinion angle feedback controlling portion (in the figure, a "pinion angle F/B controlling portion") 63, and a current application controlling portion 64.

The rotation angle θt is input into the pinion angle calculation portion 61. The pinion angle calculation portion 61 converts the rotation angle θt into an accumulation angle including a range exceeding 360° by counting a rotation number of the turning motor 33 from a rack neutral position that is a position of the rack shaft 22 when the vehicle travels straight, for example. The pinion angle calculation portion 61 calculates a pinion angle θp that is an actual rotation angle of the second pinion shaft 32 by multiplying the accumulation angle obtained by the conversion by a scaling factor based on a rotation speed ratio of the turning speed reducer 34. Note that, for example, when the pinion angle θp is an angle on the right side from the rack neutral position, the pinion angle θp is positive, and when the pinion angle θp is an angle on the left side from the rack neutral position, the pinion angle θp is negative. The turning motor 33 and the second pinion shaft 32 operate together via the turning speed reducer 34. Accordingly, the rotation angle θt of the turning motor 33 and the pinion angle θp have a correlation. By use of the correlation, the pinion angle θp can be found from the rotation angle θt of the turning motor 33. Further, the second pinion shaft 32 is engaged with the rack shaft 22. Accordingly, the pinion angle θp and the moving amount of the rack shaft 22 also have a correlation. That is, the pinion angle θp is a value that reflects the turning angle of the steered wheels 5. The pinion angle θp thus obtained is output to the pinion angle feedback controlling portion 63. In the present embodiment, the pinion angle is one example of a turning-corresponding angle.

The vehicle speed V, the steering angle θh, the steering torque Th, and the turning-side actual current value It are input into the target pinion angle calculation portion 62. The target pinion angle calculation portion 62 calculates the target pinion angle θp* as a target turning-corresponding angle that is a target for the pinion angle θp, based on the vehicle speed V, the steering angle θh, the steering torque Th, and the turning-side actual current value It. In the present embodiment, the target pinion angle calculation portion 62 is one example of a target turning-corresponding angle calculation portion.

The target pinion angle calculation portion 62 includes a steering angle ratio variable calculation portion 66 and a reduction processing portion 67. The vehicle speed V and the steering angle θh are input into the steering angle ratio variable calculation portion 66. The steering angle ratio variable calculation portion 66 calculates a converted angle θvg by adding an adjustment amount Δθ to the steering angle θh. The steering angle ratio variable calculation portion 66 changes the adjustment amount Δθ in accordance with the vehicle speed V. The adjustment amount Δθ is used to change a steering angle ratio that is a ratio of the converted angle θvg to the steering angle θh. For example, the adjustment amount Δθ is changed such that a change of the converted angle θvg to a change of the steering angle θh is made larger when the vehicle speed V is low than when the vehicle speed V is high. The steering angle θh and the converted angle θvg have a correlation. Further, the converted angle θvg is an angle as a base for the target pinion angle θp*. Accordingly, the steering angle θh and the target pinion angle θp* have a correlation. Further, the pinion angle θp is controlled based on the target pinion angle θp*. Accordingly, the steering angle θh and the pinion angle θp also have a correlation. The steering angle θh is a value that reflects the turning angle of the steered wheels 5.

The vehicle speed V, the steering torque Th, the converted angle θvg, and the turning-side actual current value It are input into the reduction processing portion 67. The reduction processing portion 67 calculates an offset angle θofst based on the vehicle speed V, the steering torque Th, the converted angle θvg, and the turning-side actual current value It. The offset angle θofst is a compensation amount at the time when the target pinion angle θp* is calculated. The offset angle θofst is an amount by which the target pinion angle θp* is brought close to the pinion angle θp. The offset angle θofst will be described later in detail.

The target pinion angle θp* and the pinion angle θp are input into the pinion angle feedback controlling portion 63. The pinion angle feedback controlling portion 63 calculates a turning force command value Tp* as a target control amount through a feedback control on the pinion angle θp so that the pinion angle θp follows the target pinion angle θp*. The target control amount is a target for the turning force.

The turning force command value Tp*, the turning-side actual current value It, and the rotation angle θt are input into the current application controlling portion 64. The current application controlling portion 64 calculates a turning-side target current value It* for the turning motor 33 based on the turning force command value Tp*. Then, the current application controlling portion 64 finds a difference between the turning-side target current value It* and a current value on dq coordinates that is obtained by converting, based on the rotation angle θt, the turning-side actual current value It detected through the turning-side current sensor 65, and the current application controlling portion 64 controls power supply to the turning motor 33 so as to eliminate the difference. The turning motor 33 generates a torque corresponding to the turning force command value Tp*. Hereby, the steered wheels 5 can be turned only by an angle corresponding to the turning force command value Tp*. Note that the turning-side target current value It* obtained by controlling power supply to the turning motor 33 is output to the target pinion angle calculation portion 62. The turning side target current value It* corresponds to a turning-side target current value. Further, the current application controlling portion 64 corresponds to a turning target current value calculation portion.

The target pinion angle θp* is calculated so as to be a control amount corresponding to the converted angle θvg to be obtained from the steering angle θh. The steered wheels 5 stand still at a position where a force to turn the steered wheels 5 balances with a frictional force of a road surface. The force to turn the steered wheels 5 includes a turning force to be applied by the turning motor 33 or a force to return the steered wheels 5 to their neutral position. A mechanical error of the turning portion 6 varies depending on the steering device 2. Further, the frictional force of the road surface varies depending on a road-surface condition. Accordingly, a turning angle at the time when the force to turn the steered wheels 5 balances with the frictional force of the road surface may deviate from a target turning angle corresponding to the target pinion angle. In this case, a difference occurs between the target turning angle and a turning angle. When the difference is small, such a situation is assumed that, even when a driving current is supplied to the turning motor 33 in accordance with the difference, the position of the steered wheels 5 thus standing still does not change. In this case, the driving current might continuously flow into the turning motor 33 in accordance with the difference between the target pinion angle θp* and the pinion angle θp, the difference being caused constantly in the pinion angle feedback controlling portion 63. In order to deal with this problem, the steering control device 1, namely, the turning controlling portion 60 includes the reduction processing portion 67.

Figure 3:
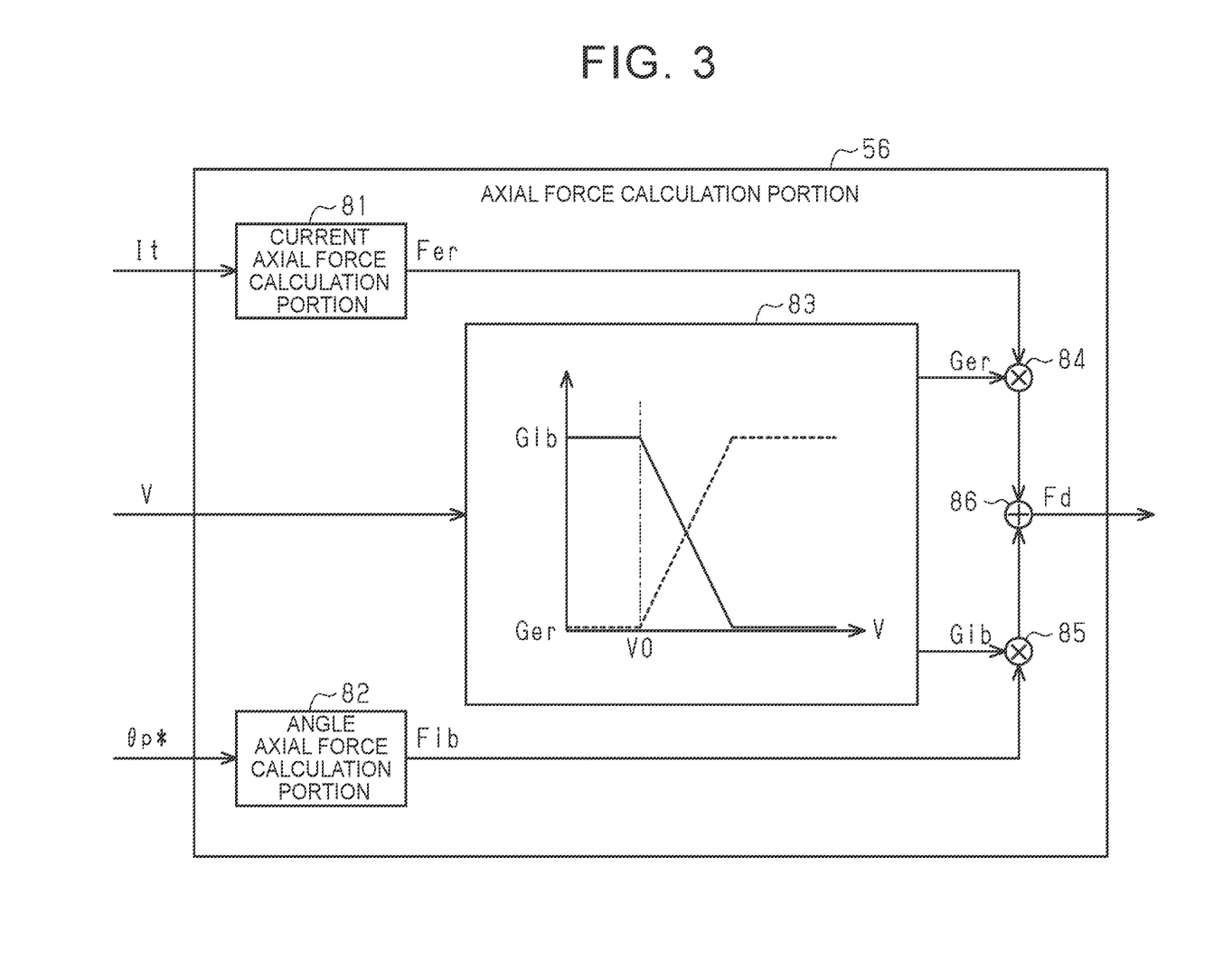
FIG. 3 is a block diagram illustrating a schematic configuration of an axial force calculation portion.

The following describes the axial force calculation portion 56. As illustrated in FIG. 3, the axial force calculation portion 56 includes a current axial force calculation portion 81, an angle axial force calculation portion 82, a distribution gain calculation portion 83, multipliers 84, 85, and an adder 86.

The turning-side actual current value It of the turning motor 33 is input into the current axial force calculation portion 81. The current axial force calculation portion 81 calculates a current axial force Fer that is an estimate value of an axial force to be applied to the rack shaft 22 through the steered wheels 5, based on the turning-side actual current value It. Here, the turning-side actual current value It of the turning motor 33 changes when a difference is caused between the target pinion angle θp* and the actual pinion angle θp due to a disturbance acting on the steered wheels 5. The disturbance corresponds to a road-surface condition, namely, a frictional resistance of a road surface. That is, the turning-side actual current value It of the turning motor 33 reflects an actual road-surface reaction force acting on the steered wheels 5. Accordingly, the current axial force Fer reflecting an influence of the road-surface condition can be calculated based on the turning-side actual current value It of the turning motor 33. The current axial force calculation portion 81 calculates the current axial force Fer with a larger absolute value as the absolute value of the turning-side actual current value It is larger.

The target pinion angle θp* is input into the angle axial force calculation portion 82. The angle axial force calculation portion 82 calculates an angle axial force Fib that is an ideal value of the axial force to be applied to the rack shaft 22 through the steered wheels 5, based on the target pinion angle θp*. The angle axial force calculation portion 82 calculates the axial force Fib with a larger absolute value as the absolute value of the target pinion angle θp* is larger.

The vehicle speed V is input into the distribution gain calculation portion 83. The distribution gain calculation portion 83 includes a map that defines a relationship of the vehicle speed V with distribution gains Gib, Ger. The distribution gain calculation portion 83 calculates the distribution gains Gib, Ger corresponding to the vehicle speed V by referring to the map. As indicated by a continuous line, the distribution gain Gib has a lower value when the vehicle speed V is high than when the vehicle speed V is low. Further, as indicated by a broken line, the distribution gain Ger has a larger value when the vehicle speed V is high than when the vehicle speed V is low. Note that, in the present embodiment, the distribution gain Gib and the distribution gain Ger are set to respective values such that the sum of them is "1." More specifically, in a case where the vehicle speed V is a predetermined vehicle speed threshold V0 or less, the distribution gain Gib is set to "1," and the distribution gain Ger is set to "0."

A value obtained by multiplying the current axial force Fer by the distribution gain Ger in the multiplier 84, and a value obtained by multiplying the angle axial force Fib by the distribution gain Gib in the multiplier 85 are input into the adder 86. The adder 86 calculates an axial force component Fd by adding the value obtained by multiplying the current axial force Fer by the distribution gain Ger to the value obtained by multiplying the angle axial force Fib by the distribution gain Gib.

Figure 4:
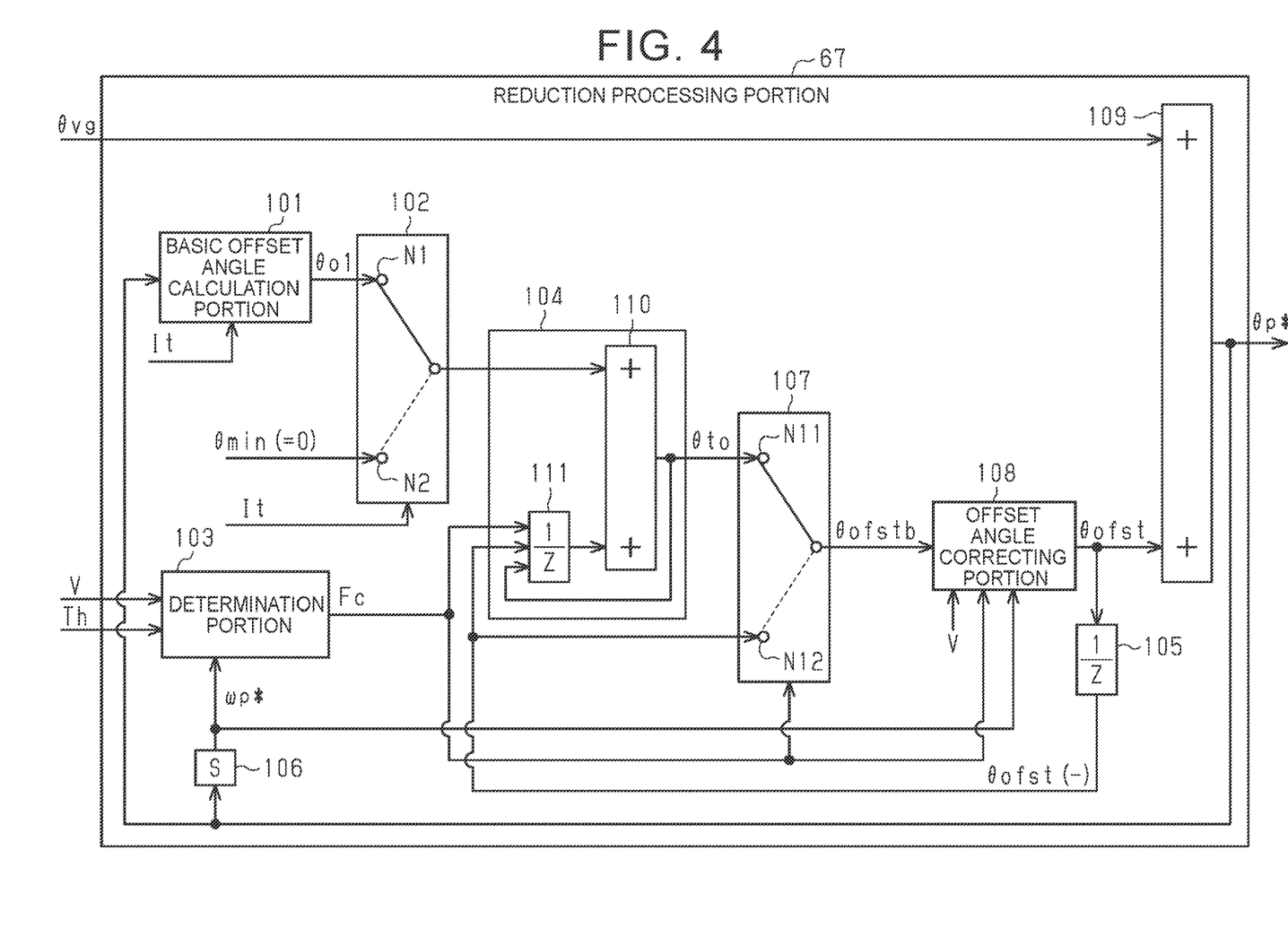
FIG. 4 is a block diagram illustrating a schematic configuration of a reduction processing portion.

The following describes a configuration of the reduction processing portion 67. As illustrated in FIG. 4, the reduction processing portion 67 includes a basic offset angle calculation portion 101, a switching portion 102, a determination portion 103, an accumulated offset angle calculation portion 104, a previous value holding portion 105, a differentiator 106, a switching portion 107, an offset angle correcting portion 108, and an adder 109.

The target pinion angle θp* and the turning-side actual current value It are input into the basic offset angle calculation portion 101. The basic offset angle calculation portion 101 includes a map that defines a relationship of a basic offset angle θo1 with the target pinion angle θp*. The basic offset angle calculation portion 101 performs map calculation to find the basic offset angle θo1 based on the target pinion angle θp* by referring to the map. As the absolute value of the target pinion angle θp* is larger, the basic offset angle calculation portion 101 calculates the basic offset angle θo1 with a larger absolute value. Further, the basic offset angle calculation portion 101 sets a sign to the basic offset angle θo1 in a direction where the turning-side actual current value It decreases, based on the turning-side actual current value It. More specifically, when the turning-side actual current value It is positive, the basic offset angle calculation portion 101 sets the sign of the basic offset angle θo1 to negative, and when the turning-side actual current value It is negative, the basic offset angle calculation portion 101 sets the sign of the basic offset angle θo1 to positive. Note that, when the turning-side actual current value It is "0," the basic offset angle calculation portion 101 sets the basic offset angle θo1 to "0."

The turning-side actual current value It, the basic offset angle θo1, and a minimum offset angle θ min are input into the switching portion 102. The minimum offset angle θ min is set as a minimum angle to be output when no offset is performed. In the present embodiment, the minimum offset angle θ min is set to "0." The basic offset angle θo1 is input into a first input N1 of the switching portion 102. The minimum offset angle θ min is input into a second input N2 of the switching portion 102.

When the turning-side actual current value It thus input is larger than a current threshold I0, the switching portion 102 controls a selection state such that the basic offset angle θo1 input into the first input N1 is output to the accumulated offset angle calculation portion 104. When the turning-side actual current value It thus input is the current threshold I0 or less, the switching portion 102 controls a selection state such that the minimum offset angle θ min input into the second input N2 is output to the accumulated offset angle calculation portion 104. In the present embodiment, in a case where a determination flag Fc is input into the switching portion 102, the switching portion 102 shifts to a state where a reduction process of reducing a driving current is to be executed, and in a case where the determination flag Fc is not input into the switching portion 102, the switching portion 102 shifts to a state where the execution of the reduction process is stopped. The current threshold I0 is set to a value of the turning-side actual current value It such that, when the turning-side actual current value It goes below this value, a driving current to be supplied to the turning motor 33 is considered to be sufficiently small.

A target pinion angle speed ωp* obtained through the differentiator 106 by differentiating the vehicle speed V, the steering torque Th, and the target pinion angle θp* is input into the determination portion 103. The determination portion 103 generates the determination flag Fc based on which whether the reduction process of reducing the driving current is to be executed or not is switched, based on the vehicle speed V, the steering torque Th, and the target pinion angle speed ωp*. When the vehicle speed V is a low vehicle speed including a stop state of a host vehicle and when the steering wheel 3 is in a steering hold state or the steering wheel 3 is in a hand-off state, the determination portion 103 generates the determination flag Fc indicating that the reduction process of reducing the driving current is to be executed. In the meantime, when the vehicle speed V is not a low vehicle speed, or when the steering wheel 3 is not in the steering hold state and the steering wheel 3 is not in the hand-off state, the determination portion 103 does not generates the determination flag Fc.

When the vehicle speed V is a vehicle speed threshold V0 or less, the determination portion 103 determines that the vehicle speed V is a low vehicle speed including the stop state of the host vehicle. The vehicle speed threshold V0 is about a value based on which it is considered that the host vehicle travels at low speed, and more specifically, the vehicle speed threshold V0 is set to a value of the vehicle speed V that does not include road surface information. That is, the vehicle speed threshold V0 is set to a value of the vehicle speed V at the time when the distribution gain Gib is "1," and the distribution gain Ger is "0." In the present embodiment, the vehicle speed V is one example of a travel state amount.

When the steering torque Th is a steering hold torque threshold Th0 or more, and the target pinion angle speed ωp* that is a change amount of the target pinion angle θp* is a steering hold angle speed threshold ω0 or less, the determination portion 103 determines that the steering wheel 3 is in the steering hold state. The steering hold torque threshold Th0 is set to about a value of the steering torque Th based on which it is considered that steering is input into the steering wheel 3 by the driver. The steering hold angle speed threshold ω0 is set to about a value of the target pinion angle speed ωp* based on which it is considered that the turning angle of the steered wheels 5 does not change. That is, the steering hold angle speed threshold $\omega 0$ is set to about a value of the target pinion angle speed $\omega p^*$ at the time when the turning angle does not change because the force to turn the steered wheels 5 balances with the frictional force of the road surface. In the present embodiment, the steering torque Th and the target pinion angle speed $\omega p^*$ are examples of a steering state amount.

When the steering torque Th is a hand-off torque threshold Th1 or less, and the target pinion angle speed $\omega p^*$ is a hand-off angle speed threshold $\omega 1$ or less, the determination portion 103 determines that the steering wheel 3 is in the hand-off state. The hand-off torque threshold Th1 is set to about a value of the steering torque Th based on which it is considered that steering is not input into the steering wheel 3 by the driver. The hand-off angle speed threshold $\omega 1$ is set to about a value of the target pinion angle speed $\omega p^*$ at the time when the steered wheels 5 are to return to their neutral position by self-aligning torque. The hand-off angle speed threshold $\omega 1$ is set to be smaller than a value of the target pinion angle speed $\omega p^*$ at the time when the driver cuts the steering wheel or cuts back the steering wheel. Note that the hand-off angle speed threshold $\omega 1$ may be the same value as the same as the steering hold angle speed threshold $\omega 0$ or may have a different value from that of the steering hold angle speed threshold $\omega 0$.

The determination flag Fc, the value output from the switching portion 102, and an offset angle $\theta ofst(-)$ in a previous calculation cycle, the offset angle $\theta ofst(-)$ being held through the previous value holding portion 105 (described later), are input into the accumulated offset angle calculation portion 104. The accumulated offset angle calculation portion 104 calculates an accumulated offset angle $\theta to$ based on the determination flag Fe, the value output from the switching portion 102, and the offset angle $\theta ofst(-)$ in the previous calculation cycle. The accumulated offset angle calculation portion 104 includes an adder 110 and a previous value holding portion 111.

The determination flag Fc, the offset angle $\theta ofst(-)$ in the previous calculation cycle, and an accumulated offset angle $\theta to(-)$ in the previous calculation cycle are input into the previous value holding portion 111. When a state where the determination flag Fc in the previous calculation cycle is not input is changed to a state where the determination flag Fc in the previous calculation cycle is input, the previous value holding portion 111 controls a selection state such that the offset angle $\theta ofst(-)$ is output to the adder 110. The selection state where the offset angle $\theta ofst(-)$ is output appears instantaneously when the state where the determination flag Fc is not input is changed to the state where the determination flag Fc is input.

When the state where the determination flag Fc in the previous calculation cycle is not input is not changed to the state where the determination flag Fc is input, the previous value holding portion 111 controls the selection state such that the accumulated offset angle $\theta to(-)$ is output to the adder 110. The selection state where the accumulated offset angle $\theta to(-)$ is output appears when the determination flag Fc is continuously input, when the determination flag Fc is not input, and when the state where the determination flag Fc in the previous calculation cycle is input is changed to the state where the determination flag Fc in the previous calculation cycle is not input.

As such, when the state where the determination flag Fc in the previous calculation cycle is not input is changed to the state where the determination flag Fc in the previous calculation cycle is input, the offset angle $\theta ofst(-)$ is output to the adder 110. Further, when the determination flag Fc is continuously input, when the determination flag Fc is not input, or when the state where the determination flag Fc in the previous calculation cycle is input is changed to the state where the determination flag Fc in the previous calculation cycle is not input, the accumulated offset angle $\theta to(-)$ is output to the adder 110.

The value output from the switching portion 102 and the value held through the previous value holding portion 111 are input into the adder 110. The adder 110 calculates an accumulated offset angle $\theta to$ by adding up the value input from the switching portion 102 and the value held through the previous value holding portion 111. Accordingly, when the state where the determination flag Fc in the previous calculation cycle is not input is changed to the state where the determination flag Fc in the previous calculation cycle is input, a target to be added up is changed to the offset angle $\theta ofst(-)$ on which a process of decreasing an offset angle $\theta ofst$ is executed. Hereby, the accumulation of the accumulated offset angle $\theta to$ is reset.

The accumulated offset angle $\theta to$ calculated by the adder 110, the offset angle $\theta ofst(-)$ in the previous calculation cycle that is held through the previous value holding portion 105, and the determination flag Fc are input into the switching portion 107. The accumulated offset angle $\theta to$ is input into a first input N11 of the switching portion 107. The offset angle $\theta ofst(-)$ is input into a second input N12 of the switching portion 107.

In a case where the determination flag Fc is input, the switching portion 107 controls a selection state such that the accumulated offset angle $\theta to$ is output to the offset angle correcting portion 108 as an uncorrected offset angle $\theta ofstb$. In a case where the determination flag Fc is not input, the switching portion 107 controls the selection state such that the offset angle $\theta ofst(-)$ is output to the offset angle correcting portion 108 as the uncorrected offset angle $\theta ofstb$. In the present embodiment, in a case where the determination flag Fc is input into the switching portion 107, the switching portion 107 shifts to a state where the reduction process is executed, and in a case where the determination flag Fc is not input into the switching portion 107, the switching portion 107 shifts to a state where the execution of the reduction process is stopped. Thus, the switching portion 107 switches between the state where the reduction process is executed and the state where the execution of the reduction process is stopped, depending on whether the determination flag Fc is input or not.

The vehicle speed V, the target pinion angle speed $\omega p^*$, the determination flag Fc, and the uncorrected offset angle $\theta ofstb$ output from the switching portion 107 are input into the offset angle correcting portion 108. The offset angle correcting portion 108 calculates an offset angle $\theta ofst$ based on the vehicle speed V, the target pinion angle speed $\omega p^*$, the determination flag Fc, and the uncorrected offset angle $\theta ofstb$.

Figure 5:
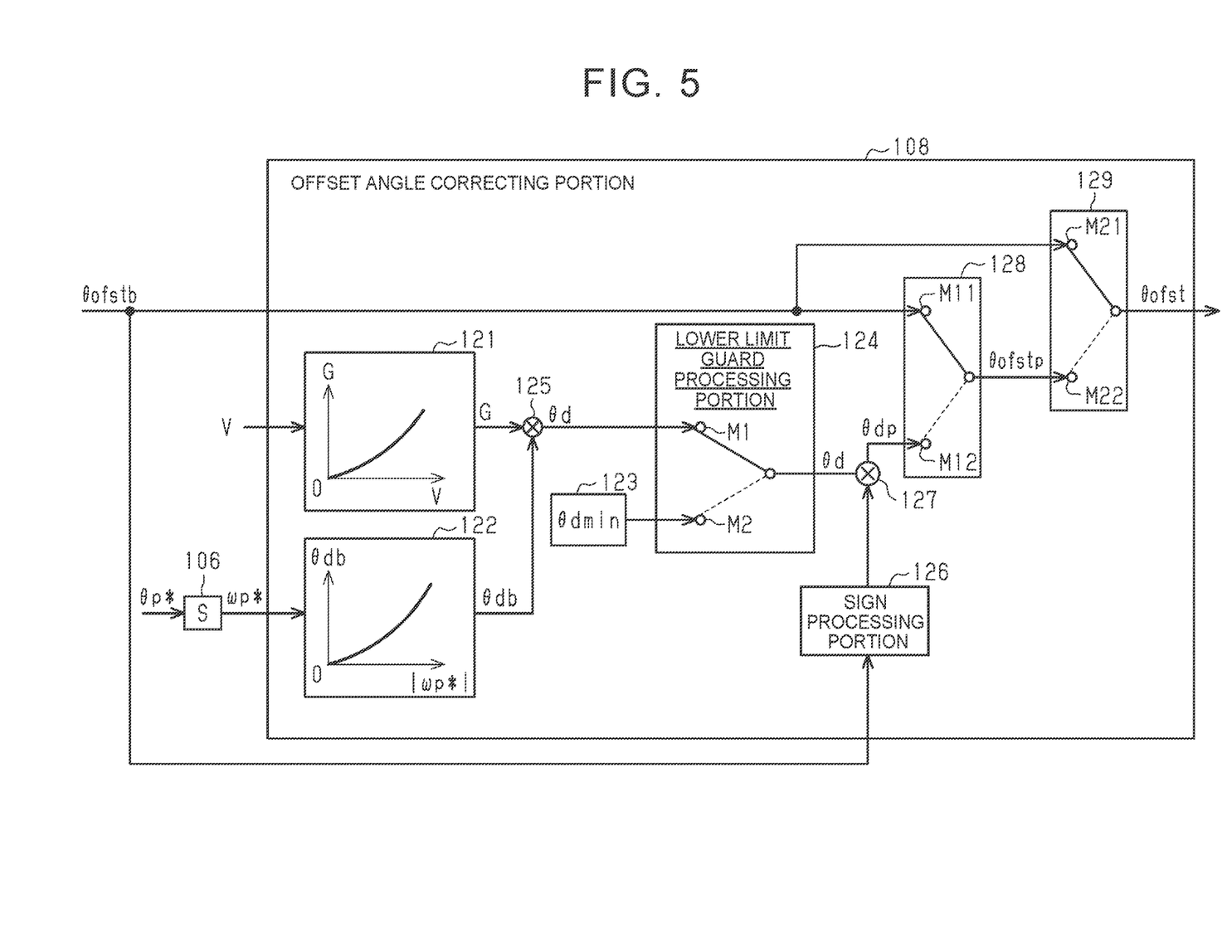
FIG. 5 is a block diagram illustrating a schematic configuration of an offset angle correcting portion.

As illustrated in FIG. 5, the offset angle correcting portion 108 includes a vehicle speed gain map calculation portion 121, a decrease map calculation portion 122, a minimum amount holding portion 123, a lower limit guard processing portion 124, a multiplier 125, a sign processing portion 126, a multiplier 127, a switching portion 128, and a switching portion 129.

The vehicle speed V is input into the vehicle speed gain map calculation portion 121. The vehicle speed gain map calculation portion 121 includes a map that defines a relationship of the vehicle speed V with a vehicle speed gain G. The vehicle speed gain map calculation portion 121 performs map calculation to find the vehicle speed gain G based on the vehicle speed V by referring to the map. The vehicle speed gain G is a gain functioning to gradually decrease the offset angle θofst so that the target pinion angle θp* does not change suddenly due to a decrease in the offset angle θofst. With the vehicle speed gain G, the offset angle θofst can be decreased without giving an uncomfortable feeling to the driver when the target pinion angle θp* that is offset is brought close to the target pinion angle θp* that is not offset. The vehicle speed gain map calculation portion 121 calculates the vehicle speed gain G with a larger absolute value as the vehicle speed V is higher.

The target pinion angle speed ωp* that is a change amount of the target pinion angle θp* is input into the decrease map calculation portion 122. The decrease map calculation portion 122 includes a map that defines a relationship of the absolute value of the target pinion angle speed ωp* with a decrease base amount θdb that is a base amount of a decrease Od. The decrease map calculation portion 122 performs map calculation to find the decrease base amount θdb based on the absolute value of the target pinion angle speed ωp* by referring to the map. The decrease base amount θdb is a component functioning to gradually decrease the offset angle θofst so that the target pinion angle θp* does not change suddenly due to a decrease in the offset angle θofst. The decrease map calculation portion 122 calculates the decrease base amount θdb with a larger absolute value as the absolute value of the target pinion angle speed ωp* is larger, that is, the change amount of the turning angle of the steered wheels 5 is larger.

The minimum amount holding portion 123 is a predetermined storage area of a memory (not illustrated) in which a minimum amount θdmin of the decrease Gd is stored. The minimum amount θdmin is a component functioning to decrease the offset angle θofst so that the offset angle θofst does not remain constantly. The minimum amount θdmin is set to a value within a range experimentally demanded as an indicator to secure a minimum as the decrease Gd even when the decrease Gd output from the multiplier 125 is smaller than the minimum amount θdmin.

The decrease Gd output from the multiplier 125 and the minimum amount θdmin output from the minimum amount holding portion 123 are input into the lower limit guard processing portion 124. The decrease Gd is input into a first input M1 of the lower limit guard processing portion 124. The minimum amount θdmin is input into a second input M2 of the lower limit guard processing portion 124.

The lower limit guard processing portion 124 determines whether or not the decrease Gd input into the first input M1 is the minimum amount θdmin or more. Then, when the decrease Gd input into the first input M1 is the minimum amount θdmin or more, the lower limit guard processing portion 124 controls a selection state of the lower limit guard processing portion 124 such that the decrease Gd input into the first input M1 is output as a final decrease Gd. In the meantime, when the decrease Gd input into the first input M1 is smaller than the minimum amount θdmin, the lower limit guard processing portion 124 controls the selection state of the lower limit guard processing portion 124 such that the minimum amount θdmin is output as the final decrease Gd. That is, the lower limit guard processing portion 124 operates to decrease the offset angle θofst at least by the minimum amount θdmin so that the offset angle θofst does not remain constantly. Hereby, it is possible to restrain the offset angle θofst from remaining constantly.

The uncorrected offset angle θofstb output from the switching portion 107 is input into the sign processing portion 126. The sign processing portion 126 determines a sign of the uncorrected offset angle θofstb and calculates a value of "1" or "−1" as a value corresponding to the sign. When the uncorrected offset angle θofstb has a positive value, the sign processing portion 126 calculates "1," and when the uncorrected offset angle θofstb has a negative value, the sign processing portion 126 calculates "−1."

The final decrease θd output from the lower limit guard processing portion 124 and the sign output from the sign processing portion 126 are input into the multiplier 127. The multiplier 127 calculates a processed decrease θdp as a correction amount by multiplying the final decrease θd by the sign output from the sign processing portion 126.

The uncorrected offset angle θofstb output from the switching portion 107 and the processed decrease θdp calculated by the multiplier 127 are input into the switching portion 128. The uncorrected offset angle θofstb is input into a first input M11 of the switching portion 128. The processed decrease θdp is input into a second input M12 of the switching portion 128. When the uncorrected offset angle θofstb is larger than the processed decrease θdp, the switching portion 128 controls a selection state such that a value obtained by subtracting the processed decrease θdp from the uncorrected offset angle θofstb is output as an unprocessed offset angle θofstp. Further, when the unprocessed offset angle θofstp is the processed decrease θdp or less, the switching portion 128 determines the processed decrease θdp as the uncorrected offset angle θofstb, and the switching portion 128 controls a selection state such that a value obtained by subtracting the processed decrease θdp from the uncorrected offset angle θofstb is output as the unprocessed offset angle θofstp. In this case, the unprocessed offset angle θofstp is "0." Hereby, when the processed decrease θdp is larger than the unprocessed offset angle θofstp, the offset angle θofst is fully canceled by decreasing the offset angle θofst. In this case, the switching portion 128 operates such that the sign of the uncorrected offset angle θofstb is not reversed as a result of the decrease θd being reflected.

The uncorrected offset angle θofstb output from the switching portion 107, the unprocessed offset angle θofstp output from the switching portion 128, and the determination flag Fc are input into the switching portion 129. The uncorrected offset angle θofstb is input into a first input M21 of the switching portion 129. The unprocessed offset angle θofstp is input into a second input M22 of the switching portion 129. In a case where the determination flag Fc is input, the switching portion 129 controls a selection state such that the uncorrected offset angle θofstb is output as the offset angle θofst. In this case, the execution of the process of decreasing the offset angle θofst is stopped so that the target pinion angle θp* that is offset is brought close to the target pinion angle θp* that is not offset. In a case where the determination flag Fc is not input, the switching portion 129 controls the selection state such that the unprocessed offset angle θofstp is output as the offset angle θofst. In this case, the process of decreasing the offset angle θofst is executed so that the target pinion angle θp* that is offset is brought close to the target pinion angle θp* that is not offset.

As such, when the unprocessed offset angle θofstp has a value other than zero, the offset angle correcting portion 108 operates such that the decrease θd output from the lower limit guard processing portion 124 is reflected on the unprocessed offset angle θofstp. In the meantime, when the unprocessed offset angle θofstp has a value of zero, the offset angle correcting portion 108 operates such that the decrease θd output from the lower limit guard processing portion 124 is not reflected on the unprocessed offset angle θofstp. Hereby, the offset angle θofst for correcting the converted angle θvg is gradually changed.

Referring back to FIG. 4, the converted angle θvg calculated by the steering angle ratio variable calculation portion 66 and the offset angle θofst calculated by the offset angle correcting portion 108 are input into the adder 109. The adder 109 calculates the target pinion angle θp* by adding the offset angle θofst to the converted angle θvg. Thus, a corrected target pinion angle θp* is calculated by adding the offset angle θofst to the converted angle θvg corresponding to an original target pinion angle. Accordingly, when the vehicle speed V is a low vehicle speed including the stop state of the host vehicle and when the steering wheel 3 is in the steering hold state or the steering wheel 3 is in the hand-off state, a difference between the corrected target pinion angle θp* and the pinion angle θp is equal to or less than a difference between the converted angle vg and the pinion angle θp. Hereby, the reduction processing portion 67 executes the reduction process. A target turning-corresponding angle correcting portion described in Claims corresponds to the adder 109. Further, an offset angle calculation portion described in Claims corresponds to the basic offset angle calculation portion 101, the switching portion 102, the determination portion 103, the accumulated offset angle calculation portion 104, the previous value holding portion 105, the differentiator 106, and the switching portion 107.

The following describes operations in the present embodiment. In a case where the travel state amount such as the vehicle speed V indicates that the target pinion angle θp* does not change, or in a case where the steering state amount such as the steering torque Th indicates that the target pinion angle θp* does not change, when the force to turn the steered wheels 5 balances with the frictional force of the road surface, the pinion angle θp, that is, the turning angle does not change. At this time, a difference may be caused between the target pinion angle θp* and the pinion angle θp. In this respect, it is assumed that a state where the target pinion angle θp* does not change is a state where the need for the turning motor 33 to apply the turning force to the steered wheels 5 so as to turn the steered wheels 5 is low.

In the present embodiment, in a case where the travel state amount indicates that the target pinion angle θp* does not change, or in a case where the steering state amount indicates that the target pinion angle θp* does not change, the reduction process of reducing the driving current to be supplied to the turning motor 33 is executed. More specifically, when the vehicle speed V is a low vehicle speed including the stop state of the host vehicle and when the steering wheel 3 is in the steering hold state or the steering wheel 3 is in the hand-off state, the reduction process is executed. The reduction processing portion 67 calculates the corrected target pinion angle θp* by adding the offset angle θofst to the converted angle θvg corresponding to the original target pinion angle. Hereby, the difference between the target pinion angle θp* and the pinion angle θp is made smaller than the difference between the converted angle θvg and the pinion angle θp. In this case, the pinion angle feedback controlling portion 63 calculates the turning force command value Tp* with an absolute value smaller than that before the reduction process is executed. The current application controlling portion 64 calculates the turning-side target current value It* for the turning motor 33 such that the turning-side target current value It* becomes smaller. The turning-side target current value It* is calculated based on the turning force command value Tp*. On this account, the driving current to be supplied to the turning motor 33 is made small based on the turning-side target current value It*. Hereby, it is possible to restrain the driving current to be supplied to the turning motor 33, the driving current being caused when the pinion angle θp deviates from the target pinion angle θp* at the time when the force to turn the steered wheels 5 balances with the frictional force of the road surface.

The following describes effects of the present embodiment.

(1) It is possible to restrain the driving current to be supplied to the turning motor 33, the driving current being caused when the pinion angle θp deviates from the target pinion angle θp* at the time when the force to turn the steered wheels 5 balances with the frictional force of the road surface. Accordingly, it is possible to reduce power consumption.

(2) In a case where the vehicle speed V is a low vehicle speed, the turning motor 33 can be hardly brought into a state where the turning motor 33 applies the turning force to the steered wheels 5 so as to turn the steered wheels 5, in comparison with a case where the vehicle speed V is a high vehicle speed. Particularly, in a case where the vehicle stops, even when the driving current is reduced preferentially by temporarily stopping the application of the turning force by the turning motor 33 rather than continuing the application of the turning force by the turning motor 33, it is assumed that the driver can hardly have an uncomfortable feeling or any inconvenience. Accordingly, the state where the reduction process is executed can be made more appropriate under the condition that the vehicle speed V is a low vehicle speed.

(3) In a case where the steering state amount has a value indicating that the steering wheel 3 is in the steering hold state or the steering wheel 3 is in the hand-off state, it is assumed that the driver does not input, into the steering portion 4, steering to change the pinion angle θp. In this case, the steered wheels 5 can be hardly brought into a state where the steered wheels 5 are turned by receiving the turning force from the turning motor 33, in comparison with cases such as a case where the driver cuts the steering wheel 3. Accordingly, even when the driving current is reduced preferentially by temporarily stopping the application of the turning force by the turning motor 33 rather than continuing the application of the turning force by the turning motor 33, it is assumed that the driver can hardly have an uncomfortable feeling or any inconvenience. From this point, the state where the reduction process is executed can be made more appropriate under the condition that the steering state amount has a value indicating that the steering wheel 3 is in the steering hold state or the steering wheel 3 is in the hand-off state.

(4) When the target pinion angle θp* is brought close to the pinion angle θp, it is possible to decrease the difference between the target pinion angle θp* and the pinion angle θp.

(5) The frictional force of the road surface varies depending on the road-surface condition, and therefore, the difference between the target pinion angle θp* and the pinion angle θp varies each time. Accordingly, it is assumed that an appropriate offset angle θofst to decrease the difference between the target pinion angle θp* and the pinion angle θp varies each time. In view of this, the offset angle correcting portion 108 corrects the uncorrected offset angle θofstb at every calculation cycle. Hereby, the target pinion angle θp* can be corrected appropriately such that the target pinion angle θp* is brought close to the pinion angle θp.

(6) The offset angle correcting portion 108 gradually decreases the offset angle θofst by which the target pinion angle θp* is brought close to the pinion angle θp, by calculating the decrease θd by which the uncorrected offset angle θofstb is decreased. By gradually decreasing the offset angle θofst, the target pinion angle θp* changes slowly. This makes it possible to slowly shift from the state where the reduction process is executed to the state where the reduction process is not executed.

(7) Since power consumption can be reduced, it is possible to restrain the steering control device 1 and the steering device 2 from overheating. Further, since power consumption can be reduced, energy saving of the steering device 2 can be achieved.

The above embodiment may be modified as follows. Further, the other embodiments described below can be combined with each other as long as they do not cause any technical inconsistencies. As the travel state amount, instead of or in addition to the vehicle speed V, a yaw rate detected by a yaw rate sensor of the vehicle may be used, a distribution ratio between the distribution gains Ger, Gib may be used, or other state amounts may be used in combination, for example.

As the steering state amount, instead of or in addition to the steering torque Th and the pinion angle speed ωp, the steering angle θh or a steering angular acceleration may be used or other state amounts may be used in combination, for example. Further, only either one of the steering torque Th and the pinion angle speed ωp may be used.

Only when the vehicle speed V is determined to be a low vehicle speed including the stop state of the host vehicle, the determination portion 103 may generate the determination flag Fc. Further, the determination flag Fc may be generated only when the steering wheel 3 is determined to be in the steering hold state, or the determination flag Fc may be generated only when the steering wheel 3 is determined to be in the hand-off state. That is, in a case where at least either one of the travel state amount and the steering state amount is a state amount indicating that the target pinion angle θp* does not change, the determination portion 103 may generate the determination flag Fc.

The determination portion 103 generates the determination flag Fc based on the travel state amount and the steering state amount such as the vehicle speed V, the steering torque Th, and the pinion angle speed ωp. However, the present disclosure is not limited to this. For example, in addition to those state amounts, the determination portion 103 may generate the determination flag Fc based on a self-driving status signal indicative of an operational state of an automatic driving control function and a shift position status signal indicative of a position state of a shift position. In this case, the determination portion 103 generates the determination flag Fc further under the condition that the operational state of the self-driving control function is not on and the shift position is not in a reverse range. In the meantime, in a case where the operational state of the self-driving control function is on or the shift position is in the reverse range, the determination portion 103 does not generate the determination flag Fe. Hereby, it is possible to restrain execution of a self-driving control from being disturbed by the reduction process. Further, in a case where the shift position is in the reverse range, a so-called back guide monitor function may be provided depending on a product specification. The back guide monitor function is a function to assist a rearward movement operation of the vehicle such as reverse parking or parallel parking such that a camera is attached to a vehicle rear portion, and a video image taken by the camera and a predicted course line of the vehicle are displayed on a display provided inside a vehicle cabin. In a case where the rearward movement operation is performed at a low vehicle speed based on the function, when the reduction process is executed, the driver may have an uncomfortable feeling. In a case where the determination flag Fc is not generated at the time when the shift position is in the reverse range, it is possible to restrain the driver from having an uncomfortable feeling.

The determination portion 103 may output different determination flags Fc for a case where the steering wheel 3 is in the hand-off state and for a case where the steering wheel 3 is in the steering hold state. In this case, for example, the basic offset angle calculation portion 101 may calculate different offset angles θofst for the hand-off state and for the steering holding state by calculating different basic offset angles θo1 or the like for the hand-off state and for the steering hold state.

The switching portions 102, 107, 129 and the lower limit guard processing portion 124 each use the same value for the first input and the second input as a value to determine which signal is output out of signals input into the first input and the second input, but they may use different values. For example, the determination portion 103 may set the vehicle speed threshold V0 used when the vehicle speed V is determined to be a low vehicle speed including the stop state of the host vehicle in a state where the determination flag Fc is not output, such that the vehicle speed threshold V0 is larger than the vehicle speed threshold V0 used when the determination is made in a state where the determination flag Fc is output.

A constant value such as "0" may be input into the second input N12 of the switching portion 107. The adder 109 calculates the target pinion angle θp* by adding the offset angle θofst to the converted angle θvg. However, depending on setting of the sign of the offset angle θofst, the adder 109 may calculate the target pinion angle θp* by subtracting the offset angle θofst from the converted angle θvg.

The basic offset angle calculation portion 101 may calculate the basic offset angle θo1 based on the pinion angle θp in addition to the converted angle θvg. The reduction processing portion 67 reduces the driving current by executing the reduction process on the target pinion angle θp*. However, the reduction processing portion 67 may reduce the driving current by executing the reduction process on the turning force command value Tp* or may reduce the driving current by executing the reduction process on the turning-side target current value It*.

The reduction processing portion 67 may be added as a constituent of the steering controlling portion 50. This is effective when the target reaction force torque T* is calculated to follow the pinion angle θp. The offset angle correcting portion 108 may not have the configuration of the lower limit guard processing portion 124. In addition to that, the offset angle correcting portion 108 may function to decrease the offset angle θofst basically by the minimum amount θdmin. In this case, the vehicle speed gain map calculation portion 121 and the decrease map calculation portion 122 can be omitted. Further, the offset angle correcting portion 108 may decrease the offset angle θofst by multiplying the uncorrected offset angle θofstb by a gain. The gain in this case may be determined in consideration of states similar to the vehicle speed gain map calculation portion 121 and the decrease map calculation portion 122.

The offset angle correcting portion 108 decreases the offset angle θofst by adding, to the uncorrected offset angle θofstb, the processed decrease θdp that changes in accordance with the vehicle speed V and the pinion angle speed ωp, but the present disclosure is not limited to this. For example, when the vehicle speed V is a low vehicle speed including the stop state of the host vehicle and when the steering wheel 3 is in the steering hold state or the steering wheel 3 is in the hand-off state, the offset angle correcting portion 108 may decrease the offset angle θofst by adding a constant value to the uncorrected offset angle θofstb.

When the vehicle speed V is not a low vehicle speed including the stop state of the host vehicle or when the steering wheel 3 is not in the steering hold state or in the hand-off state, the offset angle correcting portion 108 may not decrease the offset angle θofst.

The reduction processing portion 67 may not have the configuration of the offset angle correcting portion 108. In this case, the uncorrected offset angle θofstb is output to the adder 109. The offset angle correcting portion 108 may additionally include a calculation portion that considers other states, in addition to the vehicle speed gain map calculation portion 121 and the decrease map calculation portion 122. Further, the offset angle correcting portion 108 may additionally include a calculation portion that considers other states, instead of only either of or both of the vehicle speed gain map calculation portion 121 and the decrease map calculation portion 122. The other states may be, for example, a present angle of the offset angle θofst, that is, a residual amount. In this case, a change degree of the decrease should be made more moderate as the residual amount is smaller. Further, as the other state, the offset angle θofst(−) in the previous calculation cycle may be used.

In the vehicle speed gain map calculation portion 121, a change mode of the vehicle speed gain G is modifiable appropriately. For example, the vehicle speed V may be categorized into a low vehicle speed, a middle vehicle speed, a high vehicle speed, and the like, and a different change mode of the vehicle speed gain G may be set for each vehicle speed, for example, such that, in a case of the low vehicle speed, the vehicle speed gain G is maintained to be constant.

In the decrease map calculation portion 122, a change mode of the decrease base amount θdb is modifiable appropriately. For example, the pinion angle speed ωp may be categorized into a low steering speed, a middle steering speed, a high steering speed, and the like, and a different change mode of the decrease base amount θdb may be set for each steering speed, for example, such that, in a case of the low steering speed, the decrease base amount θdb is maintained to be constant.

The minimum amount θdmin with a fixed value may be stored in the minimum amount holding portion 123. Further, the minimum amount holding portion 123 may calculate the minimum amount θdmin variable in accordance with an input value. For example, the target pinion angle θp* and the vehicle speed V are input into the minimum amount holding portion 123. The minimum amount holding portion 123 includes a first map that defines a relationship of the target pinion angle θp* with a first component, and a second map that defines a relationship of the vehicle speed V with a second component. The minimum amount holding portion 123 performs map calculation to find the first component based on the target pinion angle θp* by referring to the first map. Further, the minimum amount holding portion 123 performs map calculation to find the second component based on the vehicle speed V. The minimum amount holding portion 123 calculates a value obtained by multiplying the first component by the second component as the minimum amount θdmin. The minimum amount θdmin thus calculated is output to the lower limit guard processing portion 124.

The adder 110 can be omitted in the reduction processing portion 67, provided that the accumulation of the offset angle θofst is not considered. The control on the turning motor 33 may be performed based on a moving amount of the rack shaft 22 by directly detecting the moving amount, instead of controlling the pinion angle θp. In this case, various control amounts or the like related to the pinion angle θp in the above embodiment are replaced with various control amounts or the like related to the moving amount of the rack shaft 22.

The steering angle ratio variable calculation portion 66 may vary the steering angle ratio in accordance with a yaw rate detected by the yaw rate sensor of the vehicle, for example, in addition to the vehicle speed V. When the steering reaction force calculation portion 55 calculates the steering reaction force component Tb*, the steering reaction force calculation portion 55 should use at least the steering torque Th, and the steering reaction force calculation portion 55 may not use the vehicle speed V or may use other elements in combination.

In the above embodiment, the steering angle ratio may be fixed. In this case, the steering angle ratio variable calculation portion 66 can be omitted. In the above embodiment, as the turning motor 33, the turning motor 33 may be placed coaxially with the rack shaft 22, or the turning motor 33 may be connected to the rack shaft 22 via a belt-type speed reducer using a ball screw mechanism, for example.

In the above embodiment, the steering control device 1 can be constituted by a processing circuit including 1) one or more processors operating in accordance with a computer program (software), 2) one or more exclusive hardware circuits such as an application specific integrated circuit (ASIC) configured to execute at least one of various processes, or 3) a combination thereof. The processor includes a CPU and a memory such as a RAM or a ROM, and a program code or a command configured to cause the CPU to execute a process is stored in the memory. The memory, that is, a non-transitory computer readable medium includes all available media accessible by a general-purpose or exclusive computer.

In the above embodiment, the steering device 2 has a link-less structure in which the steering portion 4 is always separated from the turning portion 6 mechanically. However, the present disclosure is not limited to this. As indicated by an alternate long and two short dashes line in FIG. 1, the steering device 2 has a structure in which the steering portion 4 is mechanically separated from the turning portion 6 by a clutch 25.

What is claimed is:

1. A steering control device configured to control a steer-by-wire steering device having a structure in which transmission of power between a steering portion and a turning portion is cut off, the steering portion being connected to a steering wheel, the turning portion being configured to turn steered wheels in response to steering input into the steering portion, the steering control device comprising a central processing unit configured to:
   control an operation of a turning motor configured to apply a turning force to the turning portion, the turning force being a force by which the steered wheels are turned, the central processing unit controlling the operation of the turning motor by:
   calculating a turning target current value for a driving current to be supplied to the turning motor by executing a turning-angle feedback control so that an actual turning-corresponding angle for a turning angle of the steered wheels follows a target turning-corresponding angle for the turning angle of the steered wheels; and controlling the operation of the turning motor based on the turning target current value that has been calculated, wherein the central processing unit is configured to execute a reduction process of reducing the driving current supplied to the turning motor to a value that is less than a value calculated by the turning-angle feedback control for a difference between the actual turning-corresponding angle and the target turning-corresponding angle, the reduction process being executed in a case where at least one of a travel state amount and a steering state amount indicates that the target turning-corresponding angle remains constant, the travel state amount being indicative of a travel state of a host vehicle, the steering state amount being indicative of a steering state of the host vehicle, the central processing unit is configured to calculate the target turning-corresponding angle in accordance with steering input into the steering portion, and the central processing unit is configured to execute the reduction process by altering the target turning-corresponding angle so as to be closer to the actual turning-corresponding angle.

2. The steering control device according to claim 1, wherein, in a case where the travel state amount is a vehicle speed, the central processing unit is configured to determine that the travel state amount indicates that the target turning-corresponding angle remains constant so as to execute the reduction process when the vehicle speed is equal to or less than a low vehicle speed threshold including a stop state of the host vehicle.

3. The steering control device according to claim 1, wherein the central processing unit is configured to determine that the steering state amount indicates that the target turning-corresponding angle remains constant so as to execute the reduction process when the steering state amount has a value indicating that the steering wheel is in a steering hold state or the steering wheel is in a hand-off state.

4. The steering control device according to claim 1, wherein:

the central processing unit is configured to calculate an offset angle based on the target turning-corresponding angle and the actual turning-corresponding angle, the offset angle being an amount by which the target turning-corresponding angle is altered so as to be closer to the actual turning-corresponding angle;

the central processing unit is configured to calculate a corrected target turning-corresponding angle by adding or subtracting the offset angle to or from the target turning-corresponding angle; and the central processing unit is configured to calculate the turning target current value based on the corrected target turning-corresponding angle.

5. The steering control device according to claim 4, wherein:

the central processing unit is configured to calculate a corrected offset angle by correcting the offset angle calculated in a present calculation cycle, based on the travel state amount and the steering state amount; and the central processing unit is configured to calculate the corrected target turning-corresponding angle by adding or subtracting the corrected offset angle to or from the target turning-corresponding angle.

6. The steering control device according to claim 5, wherein the central processing unit is configured to calculate the corrected offset angle so as to decrease the offset angle, based on at least one of the travel state amount and the steering state amount.

7. The steering control device according to claim 4, wherein:

the central processing unit is configured to, while in a state in which the reduction process is being executed, end the execution of the reduction process when it is determined that at least one of the travel state amount and the steering state amount indicates that the target turning-corresponding angle changes; and the central processing unit is configured to gradually decrease an absolute value of the offset angle when the central processing unit shifts from the state in which the reduction process is being executed to a state in which the reduction process is no longer being executed.

* * * * *